US012530071B2

(12) United States Patent
Taing et al.

(10) Patent No.: US 12,530,071 B2
(45) Date of Patent: Jan. 20, 2026

(54) DYNAMICALLY SHUTTING DOWN COMPONENTS BASED ON OPERATION

(71) Applicant: Atmosic Technologies, Inc., Campbell, CA (US)

(72) Inventors: Senglong Taing, San Jose, CA (US); Steven Stoiber, Saratoga, CA (US)

(73) Assignee: Atmosic Technologies, Inc., Campbell, CA (US)

( * ) Notice: Subject to any disclaimer, the term of this patent is extended or adjusted under 35 U.S.C. 154(b) by 110 days.

(21) Appl. No.: 18/402,908

(22) Filed: Jan. 3, 2024

(65) Prior Publication Data
US 2024/0231466 A1    Jul. 11, 2024

Related U.S. Application Data

(60) Provisional application No. 63/437,299, filed on Jan. 5, 2023.

(51) Int. Cl.
*G06F 1/3234* (2019.01)
*G06F 1/3287* (2019.01)

(52) U.S. Cl.
CPC .......... *G06F 1/3243* (2013.01); *G06F 1/3287* (2013.01)

(58) Field of Classification Search
CPC .............................. G06F 1/3243; G06F 1/3287
See application file for complete search history.

(56) References Cited

U.S. PATENT DOCUMENTS

| 9,949,235 | B2 | 4/2018 | Su et al. | |
|---|---|---|---|---|
| 10,412,680 | B1 | 9/2019 | Hou et al. | |
| 11,178,616 | B2 | 11/2021 | Nezamfar et al. | |
| 2014/0156269 | A1* | 6/2014 | Lee | G06F 1/3287 704/231 |
| 2014/0216129 | A1* | 8/2014 | Schmidlin | G01N 33/0063 73/23.2 |
| 2016/0283284 | A1* | 9/2016 | Sun | G06F 1/329 |
| 2017/0195318 | A1* | 7/2017 | Liu | H04L 67/562 |
| 2019/0357148 | A1* | 11/2019 | Agarwal | H04W 52/0287 |

* cited by examiner

*Primary Examiner* — Nimesh G Patel
(74) *Attorney, Agent, or Firm* — Meunier Carlin & Curfman LLC (57) ABSTRACT

An IoT device includes a serial interface controller coupled to external sensors, a Bluetooth controller to transmit signals over a Bluetooth connection, a microprocessor, and a sensor hub that controls operations of the serial interface controller and the Bluetooth controller. The microprocessor is initialized to a normal power state and, in response to a first trigger, is placed in a low-power state during which some operations, including at least including polling the sensors for data, are delegated from the microprocessor to the sensor hub. In this way, the microprocessor can sleep or hibernate, thereby reducing power consumption. The microprocessor is returned to the normal power state in response to a second trigger, and responsibility for the delegated operations returns to the microprocessor. The delegated operations may also include storing the polled sensor data in memory and/or facilitating transmission of the sensor data to a host device over the Bluetooth connection.

18 Claims, 5 Drawing Sheets

DYNAMICALLY SHUTTING DOWN COMPONENTS BASED ON OPERATION

CROSS-REFERENCE TO RELATED APPLICATIONS

This application claims priority to U.S. Provisional Application No. 63/437,299 entitled "DYNAMICALLY SHUTTING DOWN COMPONENTS BASED ON OPERATION" and filed on Jan. 5, 2023, which is assigned to the assignee hereof. The disclosures of all prior applications are considered part of and are incorporated by reference in this patent application.

TECHNICAL FIELD

This disclosure relates generally to wireless devices, and specifically to power management in wireless devices.

BACKGROUND OF RELATED ART

A wireless personal area network (PAN) is a short-range wireless network typically used to interconnect various personal devices, sensors, appliances, and/or IoT devices. For example, PANs based on communication protocols such as Bluetooth® (BT) or Zigbee® may provide wireless connectivity to peripheral devices within a specific distance (such as 5 meters, 10 meter, 20 meters, or 100 meters) of the user.

Bluetooth is a short-range wireless communication protocol that supports a PAN between a host device and one or more peripheral devices. To reduce power consumption, Bluetooth® Low Energy (BLE) was developed and adopted in various applications in which data transfers occur relatively infrequently. The BLE protocol exploits the infrequent transfer of data by using a low duty-cycle operation and by placing one or both the host device and the peripheral device(s) into a sleep mode between data transmissions, thereby conserving power. However, for applications in which the peripheral device is a small IoT device having a very small battery (e.g., such as a temperature sensor having a coin-cell battery), further reductions in power consumption may be necessary for commercial practicality and success.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description presented later.

One innovative aspect of the subject matter described in this disclosure can be implemented in a wireless device such as an Internet-of-Things (IOT) device. In some implementations, the IoT device includes a serial interface controller coupled to one or more external sensors, a Bluetooth controller configured to transmit signals over a Bluetooth connection to a host device, a sensor hub coupled to the serial interface controller and the Bluetooth controller, a microprocessor, and a memory. The sensor hub may be configured to control operations of the serial interface controller and the Bluetooth controller. The memory is coupled to the microprocessor and stores instructions that, when executed by the microprocessor, causes the IoT device to perform a number of operations.

The operations may include operating the microprocessor in a normal power state after device startup, placing the microprocessor in a low-power state in response to a first trigger signal, delegating one or more operations to the sensor hub while the microprocessor is in the low-power state, the one or more delegated operations including polling the one or more external sensors for data using the sensor hub, and returning the microprocessor to the normal power state in response to a second trigger signal. In some instances, the microprocessor may be incapable of polling the one or more external sensors or facilitating transmission of the polled sensor data to the host device over the Bluetooth connection while operated in the low-power state. The sensor hub may include one or more registers storing parameters associated with polling the one or more external sensors for data. The parameters may include one or more of timing parameters, sensor parameters, data parameters, memory address parameters, or read data thresholds to be used by the sensor hub when polling the one or more external sensors for data. In some aspects, the sensor hub may also include one or more registers storing information that identifies the one or more delegated operations.

In various aspects, the method may also include preventing the sensor hub from polling the one or more external sensors for data while the microprocessor is operated in the normal power state. The one or more external sensors may include, for example, one or more of temperature sensors, humidity sensors, fluid velocity sensors, motion sensors, video cameras, lights, smart appliances, smart appliance sensors, or computer peripheral device sensors. The first trigger signal may indicate a beginning of a respective sensor polling operation, and the second trigger signal may indicate an end of the respective sensor polling operation. In some aspects, the second trigger signal may also indicate one or more conditions associated with the respective sensor polling operation.

In some instances, the one or more delegated operations further include storing the polled sensor data in the memory using the sensor hub while the microprocessor is in the low-power state. In other instances, the one or more delegated operations further include facilitating transmission of the polled sensor data, using the sensor hub, to the host device over the Bluetooth connection while the microprocessor is in the low-power state. In some aspects, the polled sensor data may be included in one or more Bluetooth advertisement messages associated with the transmission.

Another innovative aspect of the subject matter described in this disclosure can be implemented as a method for operating an IoT device. In some implementations, the method may include configuring a Bluetooth controller to transmit signals over a Bluetooth connection to a host device and configuring a sensor hub to control operations of the Bluetooth controller and a serial interface controller coupled to one or more external sensors. The method may include operating the microprocessor in a normal power state after device startup, placing the microprocessor in a low-power state in response to a first trigger signal, and delegating one or more operations to the sensor hub while the microprocessor is in the low-power state, the one or more delegated operations including polling the one or more external sensors for data using the sensor hub. The method may also include returning the microprocessor to the normal power state in response to a second trigger signal. The sensor hub may include one or more registers storing parameters associated with polling the one or more external sensors for data. The parameters may include one or more of timing parameters, sensor parameters, data parameters, memory address parameters, or read data thresholds to be used by the sensor hub when polling the one or more external sensors for data. In some aspects, the sensor hub may also include one or more registers storing information that identifies the one or more delegated operations.

In various aspects, the method may also include preventing the sensor hub from polling the one or more external sensors for data while the microprocessor is operated in the normal power state. The one or more external sensors may include, for example, one or more of temperature sensors, humidity sensors, fluid velocity sensors, motion sensors, video cameras, lights, smart appliances, smart appliance sensors, or computer peripheral device sensors. The first trigger signal may indicate a beginning of a respective sensor polling operation, and the second trigger signal may indicate an end of the respective sensor polling operation. In some aspects, the second trigger signal may also indicate one or more conditions associated with the respective sensor polling operation.

In some instances, the one or more delegated operations further include storing the polled sensor data in the memory using the sensor hub while the microprocessor is in the low-power state. In other instances, the one or more delegated operations further include facilitating transmission of the polled sensor data, using the sensor hub, to the host device over the Bluetooth connection while the microprocessor is in the low-power state. In some aspects, the polled sensor data may be included in one or more Bluetooth advertisement messages associated with the transmission.

Details of one or more implementations of the subject matter described in this disclosure are set forth in the accompanying drawings and the description herein. Other features, aspects, and advantages will become apparent from the description, the drawings, and the claims.

BRIEF DESCRIPTION OF THE DRAWINGS

Aspects of the present disclosure are illustrated by way of example and are not intended to be limited by the figures of the accompanying drawings.

Like reference numbers and designations in the various drawings indicate like elements.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® communication protocols defined by the Bluetooth Special Interest Group (SIG), or the Long Term Evolution (LTE) and Fifth Generation New Radio (5G NR) standards promulgated by the 3rd Generation Partnership Project (3GPP), among others. These RF signals may be transmitted or received using one or more of code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various implementations relate generally to power management in wireless devices, and more specifically to reducing power consumption of IoT devices. Many IoT devices include a microprocessor that performs and controls essential operations such as, for example, analog and digital signal processing, mathematical computations, creating and formatting data packets, facilitating the transmission of data packets over a wireless channel, and processing data packets received from other wireless devices, among other examples. For IoT devices associated with external sensors, the microprocessor is also responsible for polling the external sensors for data indicative of various characteristics or qualities of an associated environment, for storing the polled sensor data in memory, and for facilitating transmission of the polled sensor data to a host device over a Bluetooth connection. In addition to having a microprocessor, IoT devices typically include a hardware controller that manages serial interface controllers, Bluetooth controllers, and other controllers. The microprocessor typically accounts for a majority of the power consumption of an IoT device, and therefore it is desirable to reduce power consumption of the microprocessor.

In accordance with aspects of the present disclosure, the power consumption of an IoT device may be reduced by delegating, to a hardware controller such as a sensor hub that consumes less power than the microprocessor, one or more operations that are typically performed, managed, or otherwise facilitated by the microprocessor. The delegated operations may include any computationally non-intensive operations that can be performed, managed, or otherwise facilitated using the sensor hub (rather than the microprocessor). In various aspects, the delegated operations may include polling one or more external sensors for data, storing the polled sensor data in memory, and facilitating transmission of the polled sensor data to a host device over a Bluetooth connection, among other examples.

In some implementations, the IoT device may place the microprocessor in a normal power state after device startup, for example, so that the microprocessor is fully-powered and can facilitate performance of operations to be selectively delegated to the sensor hub. In response to a first trigger signal, the IoT device places the microprocessor in a low-power state during which one or more operations are delegated to the sensor hub. During the low-power state, the sensor hub performs, manages, or otherwise facilitates the one or more delegated operations on behalf of the microprocessor, thereby allowing the microprocessor to sleep or hibernate and minimize its power consumption. The IoT device may return the microprocessor to the normal power state in response to a second trigger signal. During the normal power state, the microprocessor resumes performance of the one or more delegated operations and the sensor hub refrains from performing, managing, or otherwise facilitating the one or more delegated operations. The first trigger signal may indicate a beginning of a respective sensor polling operation, and the second trigger signal may indicate an end of the respective sensor polling operation.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example implementations are not to be construed as limited to specific examples described herein but rather to include within their scope all embodiments defined by the appended claims.

The various illustrative logical blocks, modules, circuits, and instructions described in connection with the implementations disclosed herein may be executed by one or more processors, such as one or more digital signal processors (DSPs), general-purpose microprocessors, application specific integrated circuits (ASICs), application specific instruction set processors (ASIPs), field programmable gate arrays (FPGAs), or other equivalent integrated or discrete logic circuitry. The term "microprocessor" as used herein may refer to any of the foregoing structures or any other structure suitable for implementation of the techniques described herein. In addition, the functionality described herein may be provided within dedicated software modules or hardware modules configured as described herein. Also, the techniques disclosed herein may be fully implemented in one or more circuits or logic elements. A general-purpose microprocessor may be any suitable processor such as, for example, a central processing unit (CPU), a microprocessor unit (MPU), or graphics processing unit (GPU), among other examples. A general-purpose microprocessor may also be implemented as a combination of computing devices such as a DSP and a microprocessor, a plurality of microprocessors, or any other suitable configuration. The terms "controller" and "microcontroller" as used herein refer to processing circuitry that is relatively simple and relatively small compared to a microprocessor. For example, a hardware controller does not require BIOS code for boot-up at device startup, does not include arithmetic logic units (ALUs), and consumes less power than microprocessors. Further, in some implementations, one or more of the various logical blocks, modules, circuits, and instructions described in connection with the implementations disclosed herein may be implemented in a system-on-chip (SoC).

Figure 1:
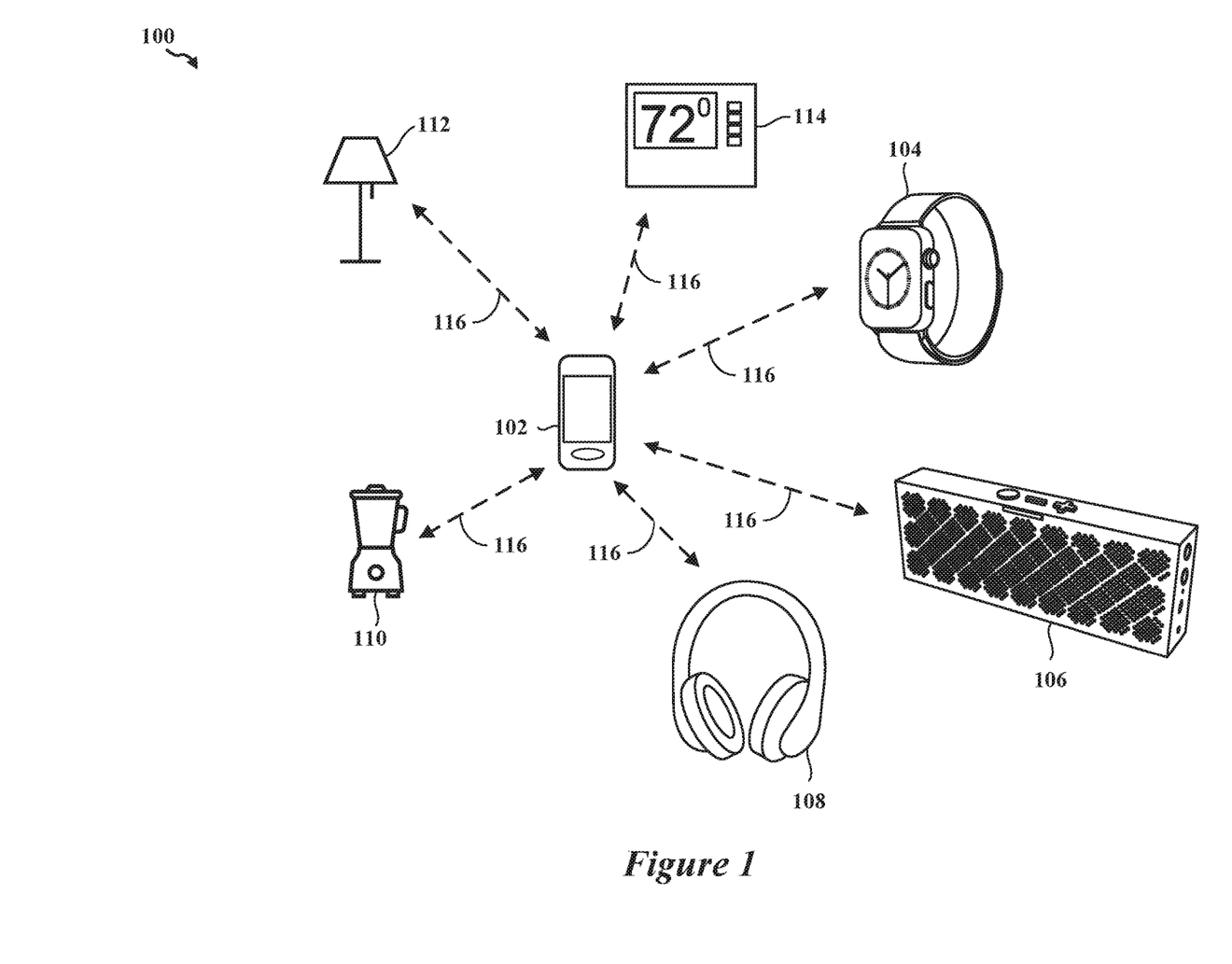
FIG. 1 shows a pictorial diagram of an example Personal Area Network (PAN), according to various aspects of the present disclosure.

FIG. 1 shows a pictorial diagram of an example Personal Area Network (PAN) 100, according to some implementations. As shown, a central device 102 may establish a Bluetooth or BLE connection 116 with one or more peripheral devices 104, 106, 108, 110, 112, 114 using a suitable Bluetooth or BLE protocol. The Bluetooth and BLE protocols are part of the Bluetooth core specification provided by the Bluetooth SIG and typically use frequency-hopping techniques within the 2.4 GHz Industrial, Scientific & Medical (ISM) radio-frequency (RF) band.

The central device 102 may include suitable logic, circuitry, interfaces, processors, and/or instructions that allow the central device 102 to communicate with the peripheral devices 104, 106, 108, 110, 112, or 114 over the respective Bluetooth connections 116. The central device 102 may operate as an initiator to request establishment of a link layer (LL) connection with the peripheral devices 104, 106, 108, 110, 112, or 114. A Link Manager may be used to control operations between an application controller within the central device 102 and corresponding application controllers within the peripheral devices 104, 106, 108, 110, 112, and/or 114.

After a requested link layer connection is established between a respective peripheral device and the central device 102, the respective peripheral device is "paired" with the central device 102. Once paired, the central device 102 operates as a host device and the paired peripheral devices operate as client devices. This allows the host device to support link layer connections with a plurality of peripheral devices 104, 106, 108, 110, 112, and/or 114 operating as client devices. The central device 102 may manage various aspects of data packet communication in a link layer connection with one or more of the associated peripheral devices 104, 106, 108, 110, 112, or 114. For example, the central device 102 may determine an operation schedule in the link layer connection with one or more peripheral devices 104, 106, 108, 110, 112, or 114, and may also initiate link layer protocol data unit (PDU) exchange sequences over the link layer connections in dedicated channels within one or more scheduled connection events.

In some instances, the central device 102 may transmit the first link layer data PDU in each connection event to intended peripheral devices 104, 106, 108, 110, 112, or 114. In other instances, the central device 102 may utilize a polling scheme to poll the intended peripheral device 104, 106, 108, 110, 112, or 114 for a link layer data PDU transmission during a connection event. The intended peripheral device 104, 106, 108, 110, 112, or 114 may transmit a link layer data PDU upon receipt of packet link layer data PDU from the central device 102. In some other instances, a peripheral device 104, 106, 108, 110, 112, or 114 may transmit a link layer data PDU to the central device 102 without first receiving a link layer data PDU from the central device 102.

Examples of the central device 102 may include a cellular phone, a smartphone, a mobile station (STA), a laptop, a personal computer (PC), a desktop computer, a personal digital assistant (PDA), a satellite radio, a global positioning system, a multimedia device, a game console, a tablet, a smart watch, or a vehicle, among other examples. Examples of the peripheral devices 104, 106, 108, 110, 112, or 114 may include a video camera, wireless headphones, an electric meter, a gas pump, a toaster, a thermostat, a hearing aid, a health monitoring unit, a fluid velocity monitor, or IoT device, among other examples. Although the example PAN 100 is shown to include six peripheral devices 104, 106, 108, 110, 112, and 114 in communication with the central device 102, in other implementations, the PAN 100 may include other numbers of peripheral devices in communication with the central device 102.

When configured according to the Bluetooth protocol, the central device 102 and the peripheral devices 104, 106, 108, 110, 112, and 114 may operate according to one radio mode such as basic rate (BR)/enhanced data rate (EDR), and when configured according to the BLE protocol, the central device 102 and the peripheral devices 104, 106, 108, 110, 112, and 114 may operate according to a BLE radio mode. In some aspects, the central device 102 may be configured with dual radio modes, and therefore may be able to operate according to the BR/EDR mode and the BLE mode, for example, based on the type of short-rage wireless communication in which the device may engage. For example, the central device 102 may operate according to the BR/EDR mode for continuous streaming of data, for broadcast networks, for mesh networks, and/or for other applications in which a relatively higher data rate may be more suitable and may operate according to the BLE mode for short burst data transmissions, such as for some other applications in which power conservation may be desirable and/or a relatively lower data rate may be acceptable. In other aspects, the central device 102 may operate according to one or more other radio modes, including proprietary radio mode(s). Examples of other radio modes may include high speed radio modes, low energy radio modes, isochronous radio modes, etc.

Figure 2:
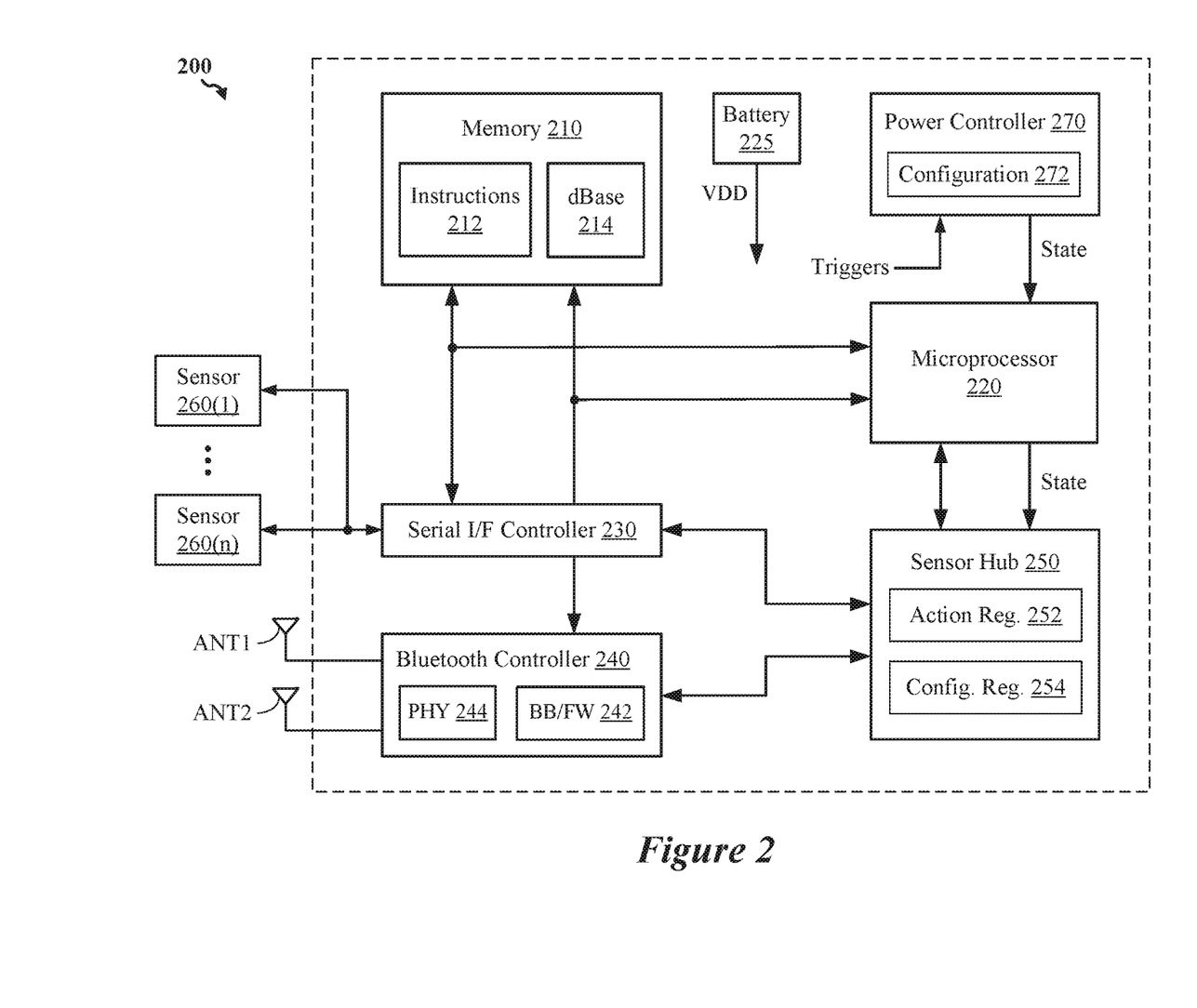
FIG. 2 shows a block diagram of a wireless device, according to various aspects of the present disclosure.

FIG. 2 shows a block diagram of an IoT device 200, according to some implementations. In some instances, the IoT device 200 may be an example of the central device 102 of FIG. 1. In other instances, the IoT device 200 may be an example of one or more of the peripheral devices 104, 106, 108, 110, 112, or 114 of FIG. 1. In the example of FIG. 2, the IoT device 200 is shown to include a memory 210, a microprocessor 220, a battery 225, a serial interface controller 230, a Bluetooth controller 240, a sensor hub 250, a number of external sensors 260(1)-260(n), a power controller 270, and antennas ANT1-ANT2. Although not shown for simplicity, the IoT device 200 may also include various wireless communication subsystems including a WLAN subsystem and/or a cellular subsystem (such as an LTE or 5G NR subsystem).

The antennas ANT1-ANT2 can transmit and receive RF signals of various frequencies. In some aspects, the antennas ANT1-ANT2 can transmit and receive RF signals in the 2.4 GHz frequency band. In other aspects, the antennas ANT1-ANT2 can also transmit and receive RF signals in the 5 GHz and/or the 6 GHz frequency band. Although only two antennas ANT1-ANT2 are shown in the example of FIG. 2, the IoT device 200 may include one or more additional antennas, for example, to provide antenna diversity, to enable more robust multiple-input, multiple-output (MIMO) communications, or to increase the number of spatial streams over which data can be transmitted to or received from other wireless devices, among other examples.

The memory 210 may be or may include a non-transitory computer-readable medium (e.g., one or more nonvolatile memory elements, such as EPROM, EEPROM, Flash memory, or a hard drive) that stores instructions 212 for execution by the microprocessor 220 and includes a database 214 that stores sensor data and other information associated with various operations of the IoT device 200. The stored data may include one or more Bluetooth profiles, one or more polling parameters, and sensor data, among other examples. The one or more Bluetooth profiles may include protocol information that allows the IoT device 200 to communicate with other Bluetooth-enabled devices over a Bluetooth or BLE link or connection. The sensor data may include data generated or captured by the external sensors 260. The polling parameters may indicate a duty cycle of polling operations for the external sensors 260, the type of serial I/O interface used by the external sensors 260, the amount of sensor data to obtain from the external sensors 260 during each polling cycle, the number of external sensors 260 to poll, start and end addresses for writing obtained sensor data into memory 210, and one or more thresholds associated with the external sensors 260, among other examples.

The microprocessor 220 is coupled to the memory 210, the serial interface controller 230, the Bluetooth controller 240, the sensor hub 250, and the power controller 270. The microprocessor 220 may be used to process signals received from the memory 210 and to forward the processed signals to the Bluetooth controller 240 for transmission via one or more of the antennas ANT1-ANT2. The microprocessor 220 may also be used to process signals received from one or more of the antennas ANT1-ANT2 via the Bluetooth controller 240 and to forward the processed signals to the memory 210. The microprocessor 220 may be any suitable processor capable of executing instructions, scripts, code, or software program stored in the memory 210. In some instances, the microprocessor 220 may be or may include an Application Specific Integrated Circuit (ASIC), an FPGA, or Programmable Logic Devices (PLDs).

The battery 225, which is coupled to the memory 210, microprocessor 220, serial interface controller 230, Bluetooth controller 240, sensor hub 250, and power controller 270 via one or more power rails (not shown for simplicity), may be any suitable battery or charge-storing device that can provide a supply voltage (VDD) sufficient to power the various components of the IoT device 200. In some instances, the battery 225 may be a nickel-cadmium "coin" battery that provides a relatively low operating voltage (such as 3.3V). In other instances, the battery 225 may be a lithium-ion battery that provides a relatively high operating voltage (such as 4.6V).

The serial interface controller 230, which is coupled to the memory 210, the microprocessor 220, the sensor hub 250, and the external sensors 260(1)-260(n), facilitates read and write operations associated with the external sensors 260(1)-260(n). In various aspects, the serial interface controller 230 may include or manage a serial interface through which sensor data is read from the external sensors 260 and/or configuration and calibration data is written. In some aspects, the serial interface controller 230 communicates with the external sensors 260 via a Serial Peripheral Interface (SPI) or an Inter-Integrated Circuit (I2C) interface, among other examples.

The external sensors 260(1)-260(n) can generate data indicative of various characteristics, qualities, or changes associated with an environment and provide the data to the IoT device 200 during one or more polling operations. Examples of the external sensors 260 may include (but are not limited to) temperature sensors, air pressure sensors, pressure sensors, humidity sensors, fluid velocity sensors, light sensors, motion sensors, security cameras, smart appliance sensors, or home sensors (e.g., a door sensors or window sensors), among other examples. In some instances, the external sensors 260 do not form part of the IoT device 200, as shown in the example of FIG. 2; in other instances, the external sensors 260 can be integrated within the IoT device 200.

The Bluetooth controller 240 is coupled to the memory 210, the sensor hub 230, and the antennas ANT1-ANT2. The Bluetooth controller 240 manages Bluetooth communications with other wireless devices (such as the host device) and may be implemented as hardware, software, firmware, or any combination thereof. In the example of FIG. 2, the Bluetooth controller 240 is shown to include a Bluetooth baseband circuit and firmware block (BB/FW) 242 and a PHY 244. The Bluetooth baseband circuit and firmware block 242 can generate baseband signals for constructing and deconstructing data frames based on the Bluetooth or BLE protocol and can generate carrier signals for up-converting baseband signals during data transmissions and for down-converting received data signals to baseband signals. The PHY 244 can receive data packets over a Bluetooth connection from a host device, demodulate and down-convert the data packets from a carrier frequency to a baseband frequency, and forward the down-converted data packets to one or more upper layers (not shown for simplicity) for processing. The PHY 244 can also encapsulate data provided from the upper layers into one or more data packets, up-convert and modulate the data packets onto the carrier frequency, and then transmit the data packets over the Bluetooth connection to the host device.

The sensor hub 250 is coupled to the serial interface controller 230, the Bluetooth controller 240, and the power controller 270. In some instances, the sensor hub 250 is a limited-purpose controller that has limited computational capabilities relative to the microprocessor 220, for example, the sensor hub 250 consumes less power than the microprocessor 220. In some aspects, the sensor hub 250 may lack a graphics unit, an arithmetic logic unit (ALU), cache memory, and BIOS, among other examples, and may therefore have lower power requirements than the microprocessor 220. The sensor hub 250, which may also be referred to as a hardware controller, can manage or otherwise control various operations of the serial interface controller 230, the Bluetooth controller 240, and other controllers (not shown for simplicity) of the IoT device 200 in a conventional manner.

In accordance with various aspects of the subject matter disclosed herein, one or more operations that are typically performed by the microprocessor 220 can be delegated to the sensor hub 250 while the microprocessor 220 is placed into a low-power state. As described above, the sensor hub 250 consumes less power than the microprocessor 220, and therefore delegating the performance of such operations to the sensor hub 250 while the microprocessor 220 sleeps or hibernates can reduce the overall power consumption of the IoT device 200. In the example of FIG. 2, the sensor hub 250 may selectively perform one or more designated operations in lieu of the microprocessor 220 based a power state signal that indicates whether the IoT device 200 is operating in a normal power state or a low-power state. Specifically, when the power state signal indicates the low-power state, the microprocessor 220 operates in a fully-powered state and can execute the instructions 212 stored within memory 210 to control polling operations associated with the external sensors 260, to control write operations of polled sensor data into the database 214 within the memory 210, and to facilitate transmission of the polled sensor data to the host device over a Bluetooth connection, among other examples. During the normal power state, the sensor hub 250 may manage the operations of various controllers of the IoT device 200 in a conventional manner.

When the power state signal transitions to indicate the low-power state, the sensor hub 250 is enabled to perform the one or more designated operations while the microprocessor 220 is placed into a sleep state, hibernation, or other suitable low-power state during which the microprocessor 220 consumes a minimal amount of power (or zero power). The designated operations may include (but are not limited to) initiating the sensor polling operations, terminating the sensor polling operations, storing polled sensor data in memory 210, and facilitating transmission of the polled sensor data to the host device over a Bluetooth connection. By delegating performance of the designated operations to the sensor hub 250 while the microprocessor 220 sleeps or hibernates in the low-power state, power consumption of the IoT device 200 may be reduced, thereby extending the battery life of the IoT device 200, and providing a competitive advantage over comparable wireless devices that operate in a conventional manner.

When the power state signal transitions to indicate the normal power state, the microprocessor 220 may be returned to the fully-powered state and the sensor hub 250 may be prevented from performing the designated operations on behalf of the microprocessor 220. As discussed, when operating in the normal power state, the microprocessor 220 can execute the instructions 212 to control sensor polling operations, to control the storage of polled sensor data into memory 210, and to facilitate transmission of the polled sensor data to the host device over the Bluetooth connection.

In some implementations, the sensor hub 250 includes action registers 252 and configuration registers 254. The action registers 252 may store the current state of the power state signal, current values of one or more trigger signals, a list of actions to be taken in response to various combinations of the power state signal and the trigger signals, or any combination thereof. The configuration registers 254 may store configuration information identifying the designated operations to be performed by the sensor hub 250 on behalf of the microprocessor 220 during the low-power state. In some instances, the configuration information may be provided to the sensor hub 250 as a configuration bitstream and stored in the configuration registers 254 prior to device start-up.

The power controller 270 includes inputs to receive first and second trigger signals and includes a state machine (not shown for simplicity) that selectively transitions the power state signal between the normal power state and the low-power state based at least in part on the trigger signals. In some instances, the power controller 270 may initialize the power state signal to indicate the normal power state during device start-up, for example, so that the microprocessor 220 and associated circuitry of the IoT device 200 are fully powered and enabled to perform their respective functions in a conventional manner. As described above, when in the normal power state, the microprocessor 220 can execute instructions 212 stored in memory 210 to facilitate sensor polling operations, the storage of polled sensor data in memory 210, and the transmission of polled sensor data to the host device, among other examples. The power controller 270 may transition the power state signal from the normal power state to the low-power state in response to the first trigger signal and may transition the power state signal from the low-power state to the normal power state in response to the second trigger signal. In some instances, the power controller 270 may also reduce or terminate power provided by battery 225 to the microprocessor 220 and associated circuitry or components while the IoT device 200 is in the low-power state, thereby reducing power consumption of the IoT device 200 as described above.

In some implementations, the first trigger signal may indicate a beginning of a respective sensor polling operation, and the second trigger signal may indicate an end of the respective sensor polling operation. In addition, or in the alternative, the second trigger signal may indicate one or more conditions associated with the sensor polling operations. For example, in some instances, the second trigger signal may indicate that the polled sensor data is of a type that requires processing and/or additional actions by the microprocessor 220, in which case the power controller 270 may transition the power state signal from the low-power state to the normal power state before the sensor polling operation is complete. In this way, the microprocessor 220 can be returned to a fully-powered state suitable for processing the polled sensor data prior to termination of the sensor polling operation, thereby reducing the time associated with the microprocessor 220 returning to the fully-powered state.

In addition, or in the alternative, the second trigger signal may indicate that values of the polled sensor data have met a certain condition, such as being greater than or less than a threshold value, in which case the power controller 270 may transition the power state signal from the low-power state to the normal power state before the sensor polling operation is complete. Accordingly, in some instances, the sensor hub 250 may include comparator circuitry that can compare values of the polled sensor data with one or more threshold values to determine whether to transition from the low-power state 304 to the normal power state 302 prior to termination of a respective sensor polling operation. The one or more threshold values may be obtained by the IoT device 200 in any suitable manner including (but not limited to) the configuration bitstream described above.

For example, when a respective external sensor 260 is a thermometer, a corresponding threshold value may indicate that the IoT device 200 is to transition from the low-power state to the normal power state when temperature values measured or otherwise obtained by the thermometer exceed a threshold temperature, irrespective of whether or not polling operations associated with the thermometer are complete. As such, when a temperature of an environment associated with the thermometer reaches or exceeds the threshold temperature, the sensor hub 250 may signal the power controller 270 to transition the power state signal from the low-power state to the normal power state. In response thereto, the microprocessor 220 may return to the fully-powered state and begin processing temperature data obtained by the thermometer even though the sensor polling operation is not complete. In some aspects, the microprocessor 220 may also assume control of the sensor polling operation from the sensor hub 250. In this way, the microprocessor 220 can be returned to the fully-powered state and begin processing data obtained by the thermometer and/or facilitate transmission of the obtained sensor data to the host device.

Figure 3:
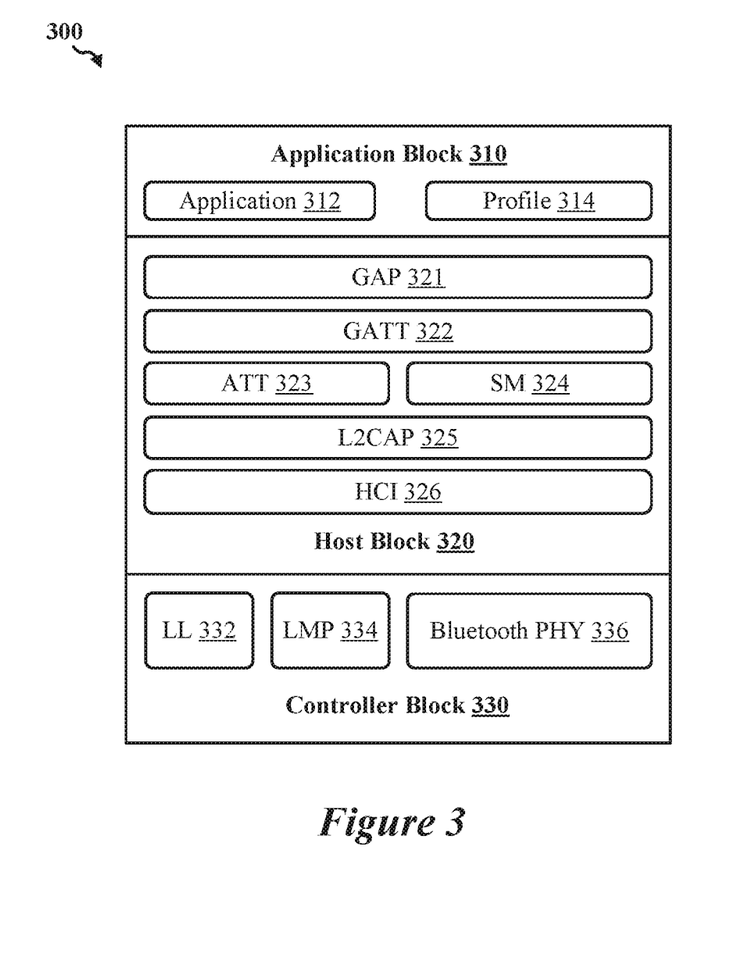
FIG. 3 shows a block diagram of an example Bluetooth protocol stack, according to various aspects of the present disclosure.

FIG. 3 shows a block diagram of a Bluetooth protocol stack 300, according to some implementations. The Bluetooth protocol stack 300 may be implemented by one or more of the memory 210, microprocessor 220, and/or the Bluetooth controller 240 described with reference to FIG. 2. In some implementations, the Bluetooth protocol stack 300 may be organized into an Application block 310, a Host block 320, and a Controller block 330. The Application block 310 may be a user application that interfaces with the other blocks and/or layers of the Bluetooth protocol stack 300. More specifically, the Application block 310 includes a higher-level Application Layer 312 and a Profile layer 314. The Application layer 312 may initiate, establish, and manage Bluetooth connections with the host device. The profile layer 314 defines the collection of attributes and permissions that allow applications associated with the Application layer 312 to use Bluetooth and BLE communications. In various aspects, the profile layer 314 may include a set of Bluetooth and BLE profiles that include (but are not limited to) A2DP, AVRCP, and HFP, among other examples.

The Host block 320 corresponds to the upper layers of the Bluetooth protocol stack 300 and may include a Generic Access Profile (GAP) 321, a Generic Attribute Protocol (GATT) 321, a Security Manager (SM) 324, an Attribute Protocol (ATT) 323, a Logical Link Control and Adaptation Protocol (L2CAP) 325, and the HCI 326. The Host block 320 may communicate with the Bluetooth controller 240 of FIG. 2 using a Host Controller Interface (HCI) 326. The HCI 326 may also be used as an interface between the Controller block 330 and the Host block 320 that allows a wide range of host devices to interface with the Controller block 330.

The Controller block 330 corresponds to the lower layers of the Bluetooth protocol stack 300 and may be used for hardware interface management, link establishment, and link management. The Controller block 330 may include a Link Layer (LL) 332, a Link Manager Protocol (LMP) 334, and a Bluetooth PHY 336. The Bluetooth PHY 336, which corresponds to the Bluetooth PHY 244 of FIG. 2, defines the mechanism for transmitting a bit stream over a Bluetooth connection. The bit stream may be grouped into code words or symbols, and converted to one or more data packets that can be transmitted over the Bluetooth connection. The Bluetooth PHY 336 may specify the frequency band, channel bandwidth, modulation, and coding scheme (MCS), cyclic-shift diversity (CSD), and other physical aspects of wireless transmissions.

The LMP 334 may be responsible for low level communication over the Bluetooth PHY 336. In various aspects, the LMP 334 may manage the sequence and timing of transmitted and received link layer data packets, and using a link layer protocol, may communicate with other devices regarding connection parameters and data flow control. The LMP 334 may use the HCI 326 to communicate with upper layers of the Bluetooth protocol stack 300. In certain aspects, the LMP 334 may be used to generate a baseband data packet and/or an empty data packet that may be transmitted using a LMP communication link established with another Bluetooth device using the LMP 334.

The LL 332 may be responsible for low level communication using the Bluetooth controller 240 of FIG. 2. The LL 332 may use the HCI 326 to communicate with upper layers of the Bluetooth protocol stack 300 and may manage the sequence and timing of transmitted and received link layer data packets using a link layer protocol. In certain aspects, the LL 332 may be used to generate a link layer data packet and/or an empty packet that may be transmitted over the Bluetooth connection to a host device.

The L2CAP 325 may encapsulate multiple protocols from the upper layers into a link layer data packet. The L2CAP 325 may also break large link layer packets from the upper layers into segments that fit into a maximum payload size on the transmit side. Similarly, the L2CAP 325 may receive multiple link layer data packets that have been segmented, and the L2CAP 325 may combine the segments into a single link layer data packet to be sent to the upper layers.

The ATT 323 may be a client/server protocol based on attributes associated with a BLE device configured for a particular purpose including (but not limited to) monitoring heart rate, monitoring temperature, and broadcasting advertisements. The attributes may be discovered, read, and written by other BLE enabled devices. The set of operations executed under control of the ATT 323 may include (but are not limited to) error handling, server configuration, find information, read operations, write operations, and queued writes. In various aspects, the ATT 323 may form the basis of data exchange between Bluetooth devices.

The SM 324 may be responsible for device pairing and key distribution. A security manager protocol implemented by the SM 324 may define how communications with the SM of a counterpart BLE deice are performed. The SM 324 may provide additional cryptographic functions that may be used by other components of the Bluetooth protocol stack 300. For example, in some aspects, the SM 324 can provide data authentication.

The GATT 322 describes a service framework using the attribute protocol for discovering services, and for reading and writing characteristic values on a counterpart BLE device. The GATT 322 interfaces with the Application layer 312 through the profile layer 314. To ensure device interoperability, data representation levels may be shared between the host device and its associated peripheral devices, and the attribute profile used by the GATT 322 may function as a bridge between the Bluetooth protocol stack 300 and the application layer 312.

Figure 4:
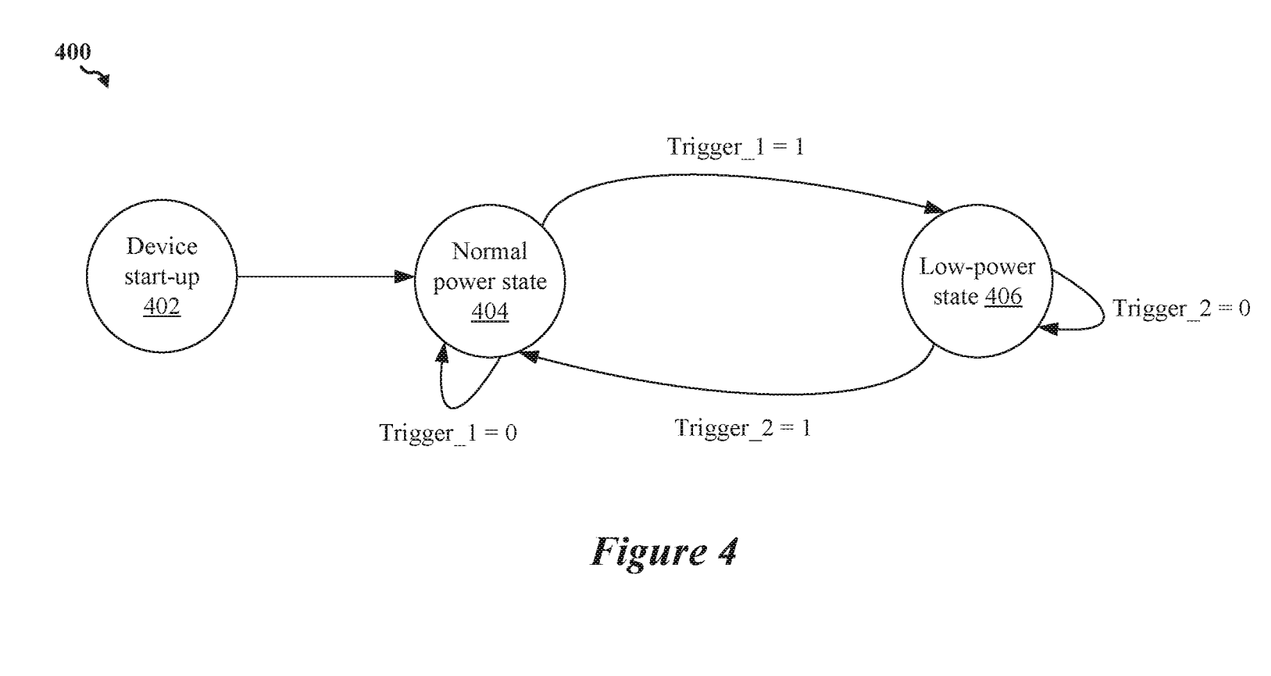
FIG. 4 shows a block diagram of an example state diagram for a power management controller, according to various aspects of the present disclosure.

FIG. 4 shows an example state machine 400 that can be used for managing the power consumption of a wireless device, in accordance with various aspects of the present disclosure. An example operation of the state machine 400 is described below with reference to the IoT device 200 of FIG. 2. As shown in the example of FIG. 4, the state machine 400 begins at device start-up 402 and initializes the IoT device 200 to the normal power state 404 during or after device start-up 402. That is, when the IoT device 200 is powered-on or reset, the state machine 400 sets the power state signal to indicate the normal power state 404, and the microprocessor 220 can execute instructions 212 stored in memory 210 to obtain configuration data for the IoT device 200. The configuration data, which may be provided by a host device over a Bluetooth connection, may indicate the initial state of the power state signal and the conditions under which the power state signal is transitioned between the normal power state 404 and the low-power state 406.

For the example of FIG. 4, the configuration data configures the power controller 270 to initialize the IoT device 200 to the normal power state 404, to transition the power state signal from the normal power state 404 to the low-power state 406 in response to a first trigger signal, and to transition the power state signal from the low-power state 406 to the normal power state 404 in response to a second trigger signal. During the normal power state 404, the microprocessor 220 can execute instructions 212 stored in memory 210 to facilitate sensor polling operations, the storage of polled sensor data in memory 210, and the transmission of polled sensor data to the host device over a Bluetooth connection, among other examples.

When the first trigger signal is asserted (e.g., Trigger_1=1), the power controller 270 transitions the power state signal from the normal power state 404 to the low-power state 406. The first trigger signal may be asserted by the microprocessor 220, the sensor hub 250, or any other suitable component associated with the IoT device 200. As discussed, the first trigger signal may indicate a beginning of a respective sensor polling operation.

During the low-power state 406, the microprocessor 220 may be placed in the low-power state, and the sensor hub 250 may be enabled to perform one or more designated operations on behalf of the microprocessor 220, thereby reducing power consumption of the IoT device 200. The one or more designated operations may be indicated by the configuration data and may include (but are not limited to) polling the external sensors 260 for data, storing the polled sensor data in memory 210, and facilitating transmission of the polled sensor data to the host device over the Bluetooth connection. For example, the sensor hub 250 can use the serial interface controller 230 to poll the external sensors 260 for sensor data, can use memory controllers (not shown for simplicity) associated with memory 210 to store the polled sensor data in the database 214, and can use the Bluetooth controller 240 to transmit the polled sensor data to the host device over a Bluetooth or BLE connection. As discussed, the sensor hub 250 may facilitate the sensor polling operations based on the polling parameters described above and stored in the configuration registers of the sensor hub 250. In some instances, the power controller 270 may also reduce or terminate power provided by battery 225 to the microprocessor 220 and associated circuitry or components while the IoT device 200 is in the low-power state.

When the second trigger signal is asserted (e.g., Trigger_2=1), the power controller 270 transitions the power state signal from the low-power state 406 to the normal power state 404. The second trigger signal may be asserted by the microprocessor 220, the sensor hub 250, or any other suitable component associated with the IoT device 200. As discussed, the second trigger signal may indicate an end of the respective sensor polling operation. In some aspects, the second trigger signal may also indicate one or more sensor polling conditions that, when met or satisfied by values of the polled sensor data, can signal the power controller 270 to transition the power state signal from the low-power state 406 to the normal power state 404 prior to completion of the respective sensor polling operation.

In response to the transition from the low-power state 406 to the normal power state 404, the microprocessor 220 exits the sleep state or hibernation and returns to a fully-powered state during which the microprocessor 220 resumes control of the one or more designated operations that were delegated to the sensor hub 250 during the low-power state 406. In some instances, the sensor hub 250 may be prevented from performing or otherwise facilitating the one or more designated operations when the IoT device 200 returns to the normal power state 404.

Figure 5:
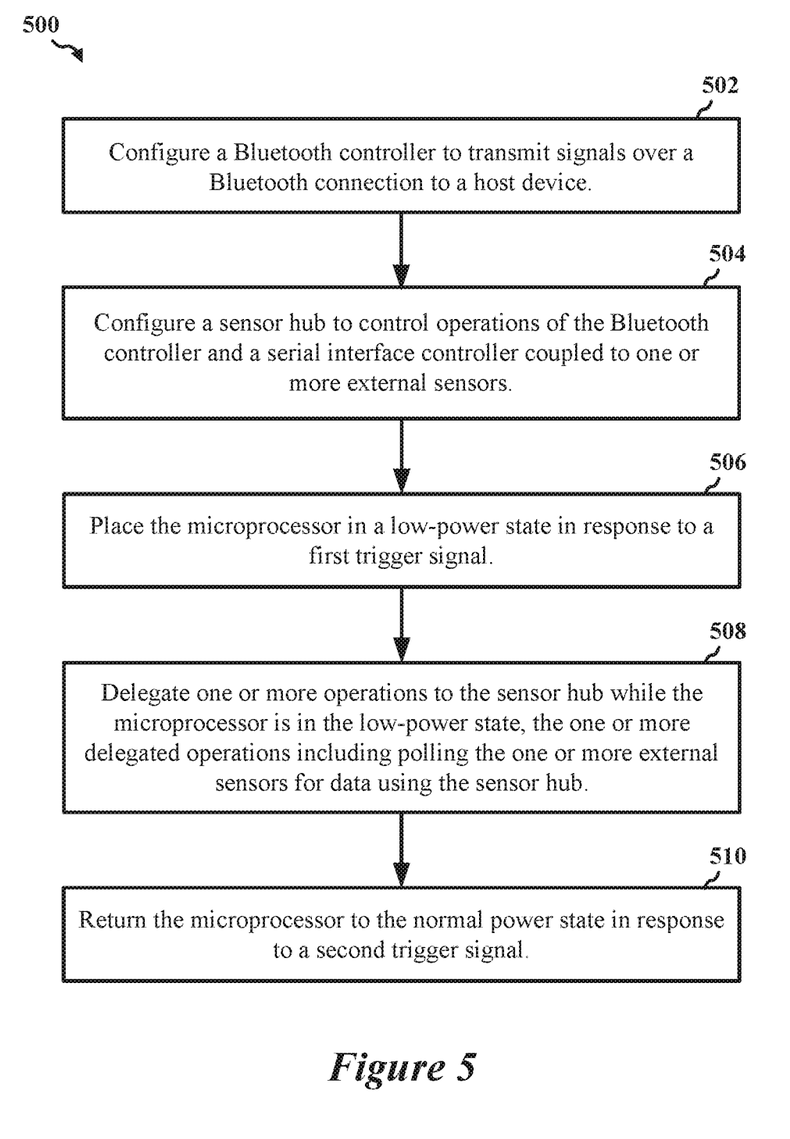
FIG. 5 shows a flowchart illustrating an example operation for operating a wireless device, according to various aspects of the present disclosure.

FIG. 5 shows a flowchart illustrating an example operation 500 of operating a wireless device, according to various aspects of the present disclosure. In some implementations, the operation 500 may be performed by a wireless device such as the IoT device 200 of FIG. 2. In other implementations, the operation 500 may be performed by one or more of the peripheral devices 104, 106, 108, 110, 112, or 114 of FIG. 1.

In some instances, the example operation 500 begins at 502 with the IoT device 200 configuring a Bluetooth controller to transmit signals over a Bluetooth connection to a host device. At 504, the IoT device 200 configures a sensor hub to control operations of the Bluetooth controller and a serial interface controller coupled to one or more external sensors. At 506, the IoT device 200 places the microprocessor in a low-power state in response to a first trigger signal. At 508, the IoT device 200 delegates one or more operations to the sensor hub while the microprocessor is in the low-power state, the one or more delegated operations including polling the one or more external sensors for data using the sensor hub. At 510, the IoT device returns the microprocessor to the normal power state in response to a second trigger signal. In various aspects, the IoT device 200 may prevent the sensor hub from performing the one or more delegated operations while the microprocessor is in the normal power state.

The microprocessor may be incapable of polling the one or more external sensors or facilitating transmission of the polled sensor data to the host device over the Bluetooth connection while operated in the low-power state. In some aspects, the first trigger signal indicates a beginning of a respective sensor polling operation, and the second trigger signal indicates an end of the respective sensor polling operation. In addition, or in the alternative, the second trigger signal may indicate one or more conditions associated with the respective sensor polling operation.

In various aspects, the one or more delegated operations also include storing the polled sensor data in the memory using the sensor hub while the microprocessor is in the low-power state. In some aspects, the one or more delegated operations also include facilitating transmission of the polled sensor data, using the sensor hub, to the host device over the Bluetooth connection while the microprocessor is in the low-power state. The polled sensor data may be included in one or more Bluetooth advertisement messages associated with the transmission. The one or more external sensors may include one or more of temperature sensors, humidity sensors, fluid velocity sensors, motion sensors, video cameras, lights, smart appliances, smart appliance sensors, computer peripheral device sensors, or any other sensor that can be associated with an IoT device.

In some instances, the sensor hub includes one or more registers storing parameters associated with polling the one or more external sensors for data. The parameters may include one or more of timing parameters, sensor parameters, data parameters, memory address parameters, or thresholds to be used by the sensor hub when polling the one or more external sensors for data. In other instances, the sensor hub includes one or more registers storing information that identifies the one or more delegated operations.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting combinations, and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the order shown or in sequential order, or that all illustrated operations be performed, to achieve desirable results. Further, the drawings may schematically depict one or more example operations in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and the described program components and systems can generally be integrated together in a single software product or packaged into multiple software products.

What is claimed is:

1. An Internet-of-Things (IoT) device, comprising:
   a serial interface controller coupled to one or more external sensors;
   a Bluetooth controller configured to transmit signals over a Bluetooth connection to a host device;
   a sensor hub coupled to the serial interface controller and the Bluetooth controller, the sensor hub configured to control operations of the serial interface controller and the Bluetooth controller;
   a microprocessor; and
   a memory coupled to the microprocessor and storing instructions that, when executed by the microprocessor, causes the IoT device to perform operations including:
   operating the microprocessor in a normal power state after device startup;
   placing the microprocessor in a low-power state in response to a first trigger signal;
   delegating one or more operations to the sensor hub while the microprocessor is in the low-power state, the one or more delegated operations including polling the one or more external sensors for data using the sensor hub and facilitating transmission of the polled sensor data from the IoT device to the host device as one or more Bluetooth advertisement messages over the Bluetooth connection while the microprocessor remains in the low-power state; and returning the microprocessor to the normal power state in response to a second trigger signal.

2. The IoT device of claim 1, wherein execution of the instructions by the microprocessor causes the IoT device to perform operations further including:

preventing the sensor hub from performing the one or more delegated operations while the microprocessor is in the normal power state.

3. The IoT device of claim 1, wherein the one or more delegated operations further include storing the polled sensor data in the memory using the sensor hub while the microprocessor is in the low-power state.

4. The IoT device of claim 1, wherein the microprocessor is incapable of polling the one or more external sensors or facilitating transmission of the polled sensor data to the host device over the Bluetooth connection while operated in the low-power state.

5. The IoT device of claim 1, wherein the sensor hub includes one or more registers storing parameters associated with polling the one or more external sensors for data.

6. The IoT device of claim 5, wherein the parameters include one or more of timing parameters, sensor parameters, data parameters, memory address parameters, or thresholds to be used by the sensor hub when polling the one or more external sensors for data.

7. The IoT device of claim 1, wherein the sensor hub includes one or more registers storing information that identifies the one or more delegated operations.

8. The IoT device of claim 1, wherein the one or more external sensors include one or more of temperature sensors, humidity sensors, fluid velocity sensors, motion sensors, video cameras, lights, smart appliances, smart appliance sensors, or computer peripheral device sensors.

9. The IoT device of claim 1, wherein the first trigger signal indicates a beginning of a respective sensor polling operation, and the second trigger signal indicates an end of the respective sensor polling operation.

10. The IoT device of claim 9, wherein the second trigger signal also indicates one or more conditions associated with the respective sensor polling operation.

11. The IoT device of claim 1, wherein the first trigger signal indicates a beginning of a respective sensor polling operation, and the second trigger signal indicates that the polled sensor data is of a type that requires processing by the microprocessor.

12. A method of operating an Internet-of-Things (IoT) device, the method comprising:

configuring a Bluetooth controller to transmit signals over a Bluetooth connection to a host device;

configuring a sensor hub to control operations of the Bluetooth controller and a serial interface controller coupled to one or more external sensors;

operating the microprocessor in a normal power state after device startup;

placing the microprocessor in a low-power state in response to a first trigger signal;

delegating one or more operations to the sensor hub while the microprocessor is in the low-power state, the one or more delegated operations including polling the one or more external sensors for data using the sensor hub and facilitating transmission of the polled sensor data from the IoT device to the host device as one or more Bluetooth advertisement messages over the Bluetooth connection while the microprocessor remains in the low-power state; and returning the microprocessor to the normal power state in response to a second trigger signal.

13. The method of claim 12, further comprising:

preventing the sensor hub from performing the one or more delegated operations while the microprocessor is in the normal power state.

14. The method of claim 12, wherein the one or more delegated operations further include storing the polled sensor data in the memory using the sensor hub while the microprocessor is in the low-power state.

15. The method of claim 12, wherein the sensor hub includes one or more registers storing parameters associated with polling the one or more external sensors for data.

16. The method of claim 15, wherein the parameters include one or more of timing parameters, sensor parameters, data parameters, memory address parameters, or thresholds to be used by the sensor hub when polling the one or more external sensors for data.

17. The method of claim 12, wherein the first trigger signal indicates a beginning of a respective sensor polling operation, and the second trigger signal indicates an end of the respective sensor polling operation.

18. The method of claim 12, wherein the first trigger signal indicates a beginning of a respective sensor polling operation, and the second trigger signal indicates that the polled sensor data is of a type that requires processing by the microprocessor.

* * * * *